US012407960B2

(12) United States Patent
Taniguchi et al.

(10) Patent No.: US 12,407,960 B2
(45) Date of Patent: Sep. 2, 2025

(54) PHOTOELECTRIC CONVERSION APPARATUS AND EQUIPMENT HAVING AD CONVERSION CIRCUITS

(71) Applicant: CANON KABUSHIKI KAISHA, Tokyo (JP)

(72) Inventors: Hiroaki Taniguchi, Tokyo (JP); Yoshiko Shigiya, Tokyo (JP); Noriyuki Shikina, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/523,682

(22) Filed: Nov. 29, 2023

(65) Prior Publication Data

US 2024/0179436 A1    May 30, 2024

(30) Foreign Application Priority Data

Nov. 30, 2022  (JP) ................. 2022-190919

(51) Int. Cl.
*H04N 25/772* (2023.01)
*H04N 25/71* (2023.01)
*H04N 25/78* (2023.01)

(52) U.S. Cl.
CPC ......... *H04N 25/772* (2023.01); *H04N 25/745* (2023.01); *H04N 25/78* (2023.01)

(58) Field of Classification Search
CPC .... H04N 25/772; H04N 25/745; H04N 25/78; H04N 25/75
See application file for complete search history.

(56) References Cited

U.S. PATENT DOCUMENTS

| 9,392,204 B2 * | 7/2016 | Saito ............... H10F 39/809 |
| 2007/0064129 A1 * | 3/2007 | Suzuki ............. H04N 25/778 |
| | | 348/E9.01 |
| 2014/0232914 A1 * | 8/2014 | Awatani ............ H04N 25/78 |
| | | 348/302 |
| 2020/0014872 A1 * | 1/2020 | Kawazu ............ H04N 25/75 |

FOREIGN PATENT DOCUMENTS

| JP | 2010074243 A | 4/2010 |
| JP | 2014017749 A | 1/2014 |
| JP | 2014165526 A | 9/2014 |
| JP | 2020174369 A | 10/2020 |

\* cited by examiner

*Primary Examiner* — Nhan T Tran
(74) *Attorney, Agent, or Firm* — Canon U.S.A., Inc. IP Division

(57) ABSTRACT

A photoelectric conversion apparatus includes a first AD conversion circuit and a second AD conversion circuit. A first analog signal group output from a first pixel group in the first scanning is input to the first AD conversion circuit and the second AD conversion circuit. A second analog signal group output from the second pixel group in the second scanning is input to the first AD conversion circuit and the second AD conversion circuit. The first AD conversion circuit and the second AD conversion circuit each include a comparator to which the first analog signal group is not input in the first scanning and the second analog signal group is input in the second scanning. The first AD conversion circuit is arranged on one end side of output lines, and the second AD conversion circuit is arranged on the other end side of the output lines.

25 Claims, 11 Drawing Sheets

PHOTOELECTRIC CONVERSION APPARATUS AND EQUIPMENT HAVING AD CONVERSION CIRCUITS

BACKGROUND

Technical Field

One disclosed aspect of the embodiments relates to a photoelectric conversion apparatus and equipment.

Description of the Related Art

Photoelectric conversion apparatuses that output pixel signals generated in a plurality of pixels via output lines each corresponding to a different one of the plurality of pixels are known. The photoelectric conversion apparatuses having such a configuration are able to acquire images for different purposes in parallel by performing a plurality of readout scanning operations in parallel. For example, during acquisition of a display image, a ranging image is able to be acquired in parallel. Japanese Patent Application Laid-Open No. 2010-074243 discusses a solid-state imaging apparatus in which pixel signals corresponding to a display image are read out to one end side of output lines, and pixel signals corresponding to a ranging image are read out to the other end side of the output lines.

The solid-state imaging apparatus discussed in Japanese Patent Application Laid-Open No. 2010-074243 still has an issue that a heat generation distribution at ends of the output lines greatly varies depending on whether the pixel signals corresponding to a ranging image are read out. This leads to variations in image quality of display images depending on whether the pixel signals corresponding to a ranging image are read out.

SUMMARY

One aspect of the embodiments is directed to providing a photoelectric conversion apparatus capable of preventing variations in image quality due to difference between driving methods.

According to an aspect of the embodiments, a photoelectric conversion apparatus includes a plurality of pixels, a plurality of output lines, a scanning circuit, a first analog-to-digital (AD) conversion circuit and a second AD conversion circuit. The plurality of pixels is arranged in a form of a plurality of rows and a plurality of columns. The plurality of output lines, arranged in one to at least one correspondence between the plurality of columns and the plurality of output lines, each is configured to receive an analog signal output from a corresponding pixel of the plurality of pixels. The scanning circuit is configured to supply a control signal to output the analog signal to the plurality of output lines. The first analog-to-digital (AD) conversion unit and the second AD conversion unit are configured to perform AD conversion on the analog signal. The scanning circuit is configured to perform a first scanning and a second scanning. In first scanning, the control signal is sequentially supplied to a first pixel group in order of the plurality of rows. The first pixel group includes two or more pixels that are of the plurality of pixels and arranged in two or more rows. In the second scanning, the control signal is sequentially supplied to a second pixel group in order of the plurality of rows. The second pixel group includes other two or more pixels that are of the plurality of pixels and arranged in two or more rows. A range from a start row to an end row of the first scanning includes at least a part of a range from a start row to an end row of the second scanning. A first analog signal group output from the first pixel group in the first scanning is input to the first AD conversion unit and the second AD conversion unit. A second analog signal group output from the second pixel group in the second scanning is input to the first AD conversion unit and the second AD conversion unit. The first AD conversion circuit and the second AD conversion circuit each include a comparator to which the first analog signal group is not input in the first scanning and the second analog signal group is input in the second scanning. In a longitudinal direction of the plurality of output lines, the first AD conversion circuit is disposed on one end side of the plurality of output lines. In the longitudinal direction of the plurality of output lines, the second AD conversion circuit is disposed on an other end side of the plurality of output lines.

Further features of the disclosure will become apparent from the following description of exemplary embodiments with reference to the attached drawings.

DESCRIPTION OF THE EMBODIMENTS

Figure 1:
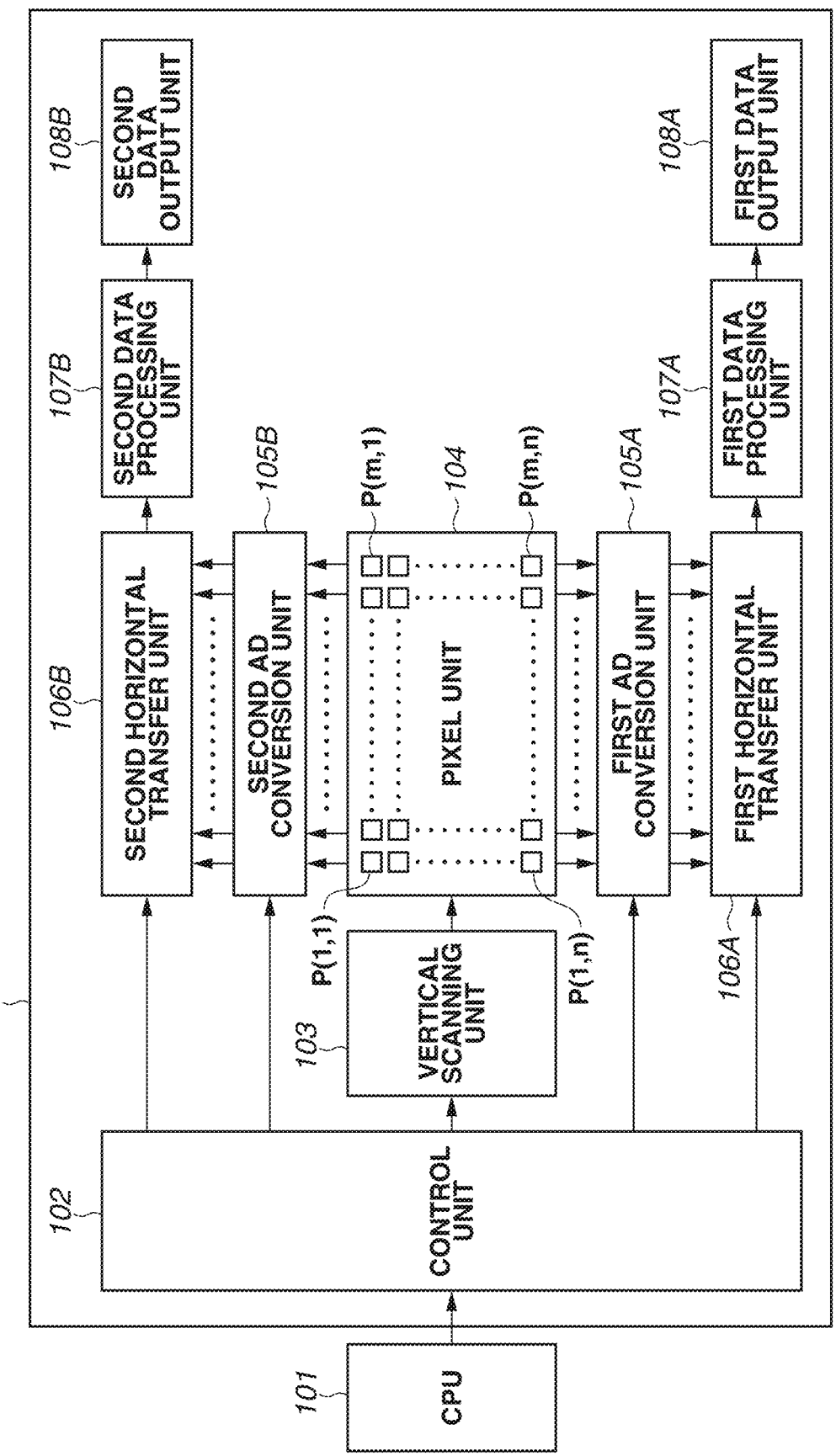
FIG. 1 is a block diagram illustrating a photoelectric conversion apparatus according to a first exemplary embodiment.

Hereinafter, exemplary embodiments will be described with reference to the drawings. Note that the following exemplary embodiments do not limit the disclosure according to the appended claims. Although a plurality of features is described in the exemplary embodiments, all the plurality of features are not necessarily essential to the disclosure, and the plurality of features may be arbitrarily combined. Further, in the accompanying drawings, the same or similar components are denoted by the same reference numerals, and the redundant descriptions will be omitted. In each exemplary embodiment described below, a sensor for imaging will be mainly described as an example of a photoelectric conversion apparatus. However, each exemplary embodiment is not limited to the sensor for imaging and is also applicable to other examples of photoelectric conversion apparatuses. Examples to which the exemplary embodiments are applicable include an imaging apparatus, a ranging apparatus (an apparatus for distance measurement or the like using focus detection or time of flight (ToF)), and a photometric apparatus (an apparatus for measurement of an amount of incident light or the like).

In this specification, terms indicating specific directions and positions (for example, up, down, right, left, and other terms including these terms) are used as necessary. These terms are used to facilitate understanding of the exemplary embodiments with reference to the drawings, and the technical scope of the disclosure is not limited by the meanings of these terms.

In this specification, the description "a member A and a member B are electrically connected" is not limited to the case where the member A and the member B are directly connected to each other. For example, even when another member C is connected between the member A and the member B, the members A and B may be electrically connected.

In this specification, a plane refers to a surface in a direction parallel to a main surface of a substrate. The main surface of the substrate may be a light incident surface of the substrate including a photoelectric conversion element, a surface on which a plurality of analog-to-digital converters (ADCs) is repeatedly arranged, or a bonding surface between substrates in a stacked photoelectric conversion apparatus. A plan view indicates a view from a direction perpendicular to the main surface of the substrate. A cross section refers to a surface in a direction perpendicular to the light incident surface of a semiconductor layer. A cross-sectional view refers to a view from a direction parallel to the main surface of the substrate.

In the following description, charges accumulated in a photoelectric conversion unit in each pixel are electrons. Transistors in each pixel are all N-channel metal-oxide-semiconductor (MOS) field-effect transistors (hereinafter, abbreviated as NMOSFETs). However, the charges accumulated in the photoelectric conversion unit may be holes, and in this case, transistors of pixels may be P-channel MOS field-effect transistors (hereinafter, abbreviated as PMOS-FETs). That is, a conductivity type of transistors or the like can be changed as appropriate in accordance with a polarity of charges processed as signals.

A photoelectric conversion apparatus according to a first exemplary embodiment of the disclosure will be described with reference to FIGS. 1 to 8.

FIG. 1 is a block diagram illustrating an example of a photoelectric conversion apparatus according to the first exemplary embodiment.

A photoelectric conversion apparatus 1 is controlled by a central processing unit (CPU) 101. The CPU 101 may be disposed inside a photoelectric conversion apparatus system in which the photoelectric conversion apparatus 1 is mounted. In other words, the CPU 101 may be disposed outside the photoelectric conversion apparatus 1. A control unit 102 operates in response to a control signal, such as a synchronization signal, and a setting signal of, for example, an operation mode, from the CPU 101.

A pixel unit 104 includes a plurality of pixels P(1, 1) to P(m, n) arranged in n rows and m columns in a form of a plurality of rows and a plurality of columns. In the present exemplary embodiment, a row direction indicates a horizontal direction in the drawing, and a column direction indicates a vertical direction in the drawing. Parenthesized letters of a pixel P(x, y) indicate a column number and a row number from the left. In the present exemplary embodiment, x is an integer from 1 to m, and y is an integer from 1 to n. A row number of the top row is the first row, and a column number of the top column is the first column. The pixel P(x, y) includes a photoelectric conversion unit and generates a pixel signal (analog signal) by photoelectric conversion.

A vertical scanning unit 103 performs shutter scanning and readout scanning of the pixel unit 104 in response to a control signal from the control unit 102. Shutter scanning refers to an operation to cause pixels of some or all rows of the pixel unit 104 to start exposure by sequentially releasing and shifting the photoelectric conversion units from a reset state to a charge accumulation state. Readout scanning refers to an operation to cause the pixels of some or all rows of the pixel unit 104 to sequentially output signals based on charges accumulated in the photoelectric conversion units.

A first analog-to-digital (AD) conversion unit 105A and a second AD conversion unit 105B each include an AD conversion circuit (or unit) and a memory. The first AD conversion unit 105A and the second AD conversion unit 105B perform AD conversion on analog signals read out from the pixel unit 104 and hold the analog signals as digital signals in the respective memories. Some output lines are electrically connected to the first AD conversion unit 105A, and the other output lines are electrically connected to the second AD conversion unit 105B.

An output node of the first AD conversion unit 105A is electrically connected to an input node of a first horizontal transfer unit 106A. The first horizontal transfer unit 106A sequentially scans and outputs the signals held in the memory of the first AD conversion unit 105A, in response to a control signal from the control unit 102. An output node of the second AD conversion unit 105B is electrically connected to an input node of a second horizontal transfer unit 106B. The second horizontal transfer unit 106B sequentially scans and outputs the signals held in the memory of the second AD conversion unit 105B, in response to a control signal from the control unit 102.

An output node of the first horizontal transfer unit 106A is electrically connected to an input node of a first data processing unit 107A. The first data processing unit 107A has a function of performing a signal process or the like on the signal read out by the first horizontal transfer unit 106A. An output node of the second horizontal transfer unit 106B is electrically connected to an input node of a second data processing unit 107B. The second data processing unit 107B has a function of performing a signal process or the like on the signal read out by the second horizontal transfer unit 106B.

An output node of the first data processing unit 107A is electrically connected to an input node of a first data output unit 108A. The first data output unit 108A includes a circuit that converts data processed by the first data processing unit 107A into a desired output format and outputs the converted data to the outside of the photoelectric conversion apparatus 1. An output node of the second data processing unit 107B is electrically connected to an input node of a second data output unit 108B. The second data output unit 108B includes a circuit that converts data processed by the second data processing unit 107B into a desired output format and outputs the converted data to the outside of the photoelectric conversion apparatus 1.

Figure 2:
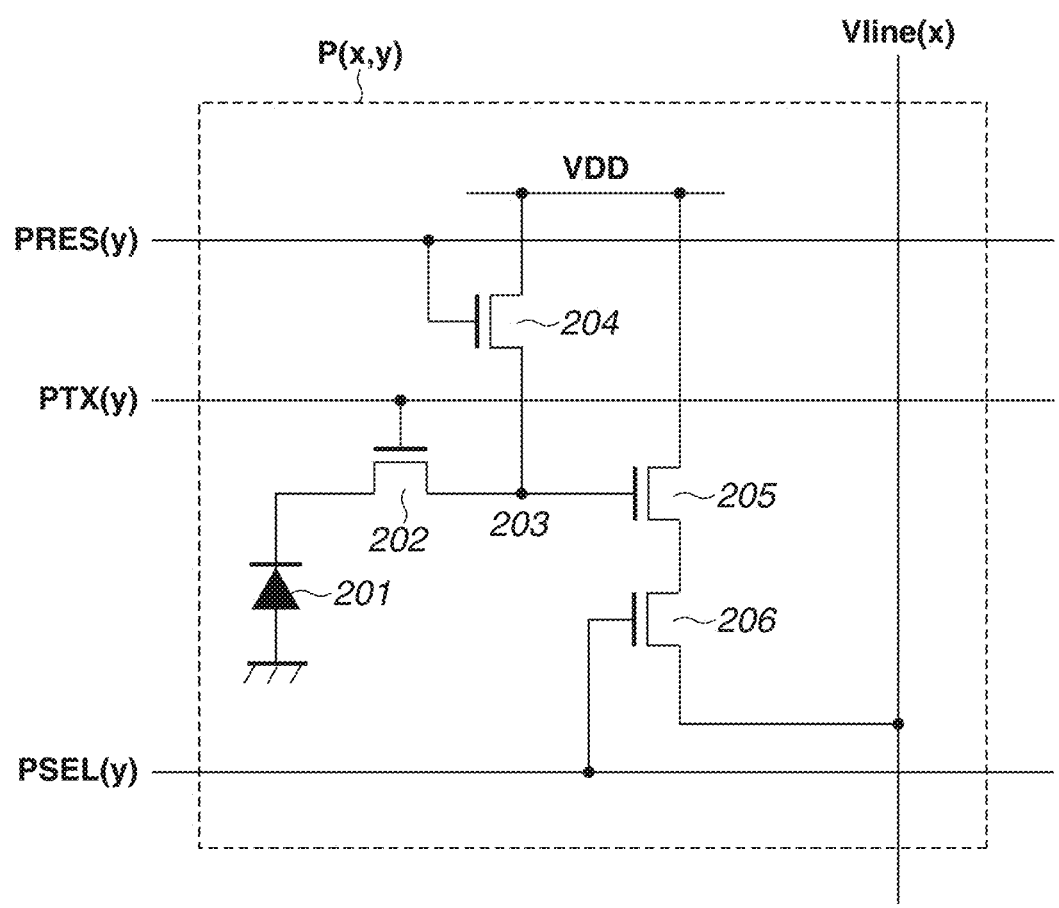
FIG. 2 is a circuit diagram illustrating the photoelectric conversion apparatus according to the first exemplary embodiment.

FIG. 2 is a circuit diagram illustrating an example of the pixel P(x, y) according to the present exemplary embodiment. In FIG. 2, the pixel P(x, y) represents a pixel arranged in a y-th row and an x-th column of the pixel unit 104.

As shown in FIG. 2, the pixel P(x, y) includes a photoelectric conversion unit 201, a transfer transistor 202, and a floating diffusion (FD) portion 203. Further, the pixel P(x, y) includes a reset transistor 204 for resetting the FD portion 203, an amplification transistor 205 for amplifying a signal, and a selection transistor 206. A power supply voltage VDD is supplied to a drain of the reset transistor 204 and a drain of the amplification transistor 205. The selection transistor 206 may be omitted, or a different transistor may be disposed.

The photoelectric conversion unit 201 is, for example, a photodiode. The photoelectric conversion unit 201 receives light incident on the pixel P(x, y) and generates a signal charge corresponding to the incident light. The reset transistor 204 is driven by a control signal PRES(y). In response to the reset transistor 204 being turned on, the FD portion 203 is reset to a voltage based on the power supply voltage VDD. In response to the reset transistor 204 being turned off, the FD portion 203 is released from the reset state. The transfer transistor 202 is driven by a control signal PTX(y). In response to the transfer transistor 202 being turned on, the signal charge generated in the photoelectric conversion unit 201 is transferred to the FD portion 203. The FD portion 203 functions as a charge voltage conversion unit that temporarily holds the signal charge input from the photoelectric conversion unit 201 and converts the held signal charge into a voltage signal. The amplification transistor 205 amplifies the analog signal converted by the FD portion 203. The selection transistor 206 is driven by the control signal PRES(y), connects the amplification transistor 205 to an output line Vline(x) of the x-th column, and outputs the analog signal amplified by the amplification transistor 205 to the output line Vline(x). A source of the amplification transistor 205 is electrically connected to a current source (not illustrated) via the selection transistor 206 and the output line Vline(x), and the amplification transistor 205 operates as a source follower circuit. In the above described way, output lines Vline(x) are disposed such that at least each of the output lines Vlines(x) corresponds to a different one of the plurality of columns, and analog signals are output from corresponding pixels P(x, y). Each of the transistors is constituted by an N-channel transistor but may be constituted by a P-channel transistor. While, in FIG. 2, one output line is disposed to correspond to one column of pixels, a plurality of output lines may be disposed to correspond to one column of pixels.

The control signal PTX(y) is a signal for controlling the transfer transistors 202 in the y-th row and is input to gates of the transfer transistors 202. The control signal PRES(y) is a signal for controlling the reset transistors 204 in the y-th row and is input to gates of the reset transistors 204. A control signal PSEL(y) is a signal for controlling the selection transistors 206 in the y-th row and is input to gates of the selection transistors 206. Each of the transistors is in a conductive state when a control signal input to the gate is at a high level, and is in a non-conductive state when the control signal input to the gate is at a low level.

A reset level signal output from the pixel P(x, y) and a photoelectric conversion signal will be described. In response to the reset transistor 204 being turned on, the FD portion 203 is reset to the voltage based on the power supply voltage VDD. In response to the reset transistor 204 being turning off, the FD portion 203 is released from the reset state. The reset level signal output from the pixel P(x, y) is a signal output from the amplification transistor 205 in accordance with the voltage of the FD portion 203 which has been released from the reset state. The reset level signal is a signal including a noise component of the pixel P(x, y). Then, in response to the transfer transistor 202 being turning on, a signal charge generated by the photoelectric conversion unit 201 photoelectrically converting incident light is transferred to the FD portion 203. The amplification transistor 205 outputs, as a photoelectric conversion signal, a signal corresponding to the voltage of the FD portion 203 to which the signal charge has been transferred. The analog signal output from the pixel P(x, y) is the reset level signal and the photoelectric conversion signal. An ultimate output from the pixel P(x, y) is acquired by a correlated double sampling (CDS) operation of difference processing between an AD conversion result of the photoelectric conversion signal and an AD conversion result of the reset level signal. Hereinafter, this operation is referred to as a readout operation. The CDS operation may be performed by the first data processing unit 107A and the second data processing unit 107B or may be performed outside the photoelectric conversion apparatus 1.

In shutter scanning of the pixel P(x, y), the photoelectric conversion unit 201 is released from the reset state.

That is, in response to turning off of the transfer transistor 202 and the reset transistor 204 which have been turned on, accumulation of signal charges starts in the photoelectric conversion unit 201. Hereinafter, this is referred to as a shutter operation.

Figure 3:
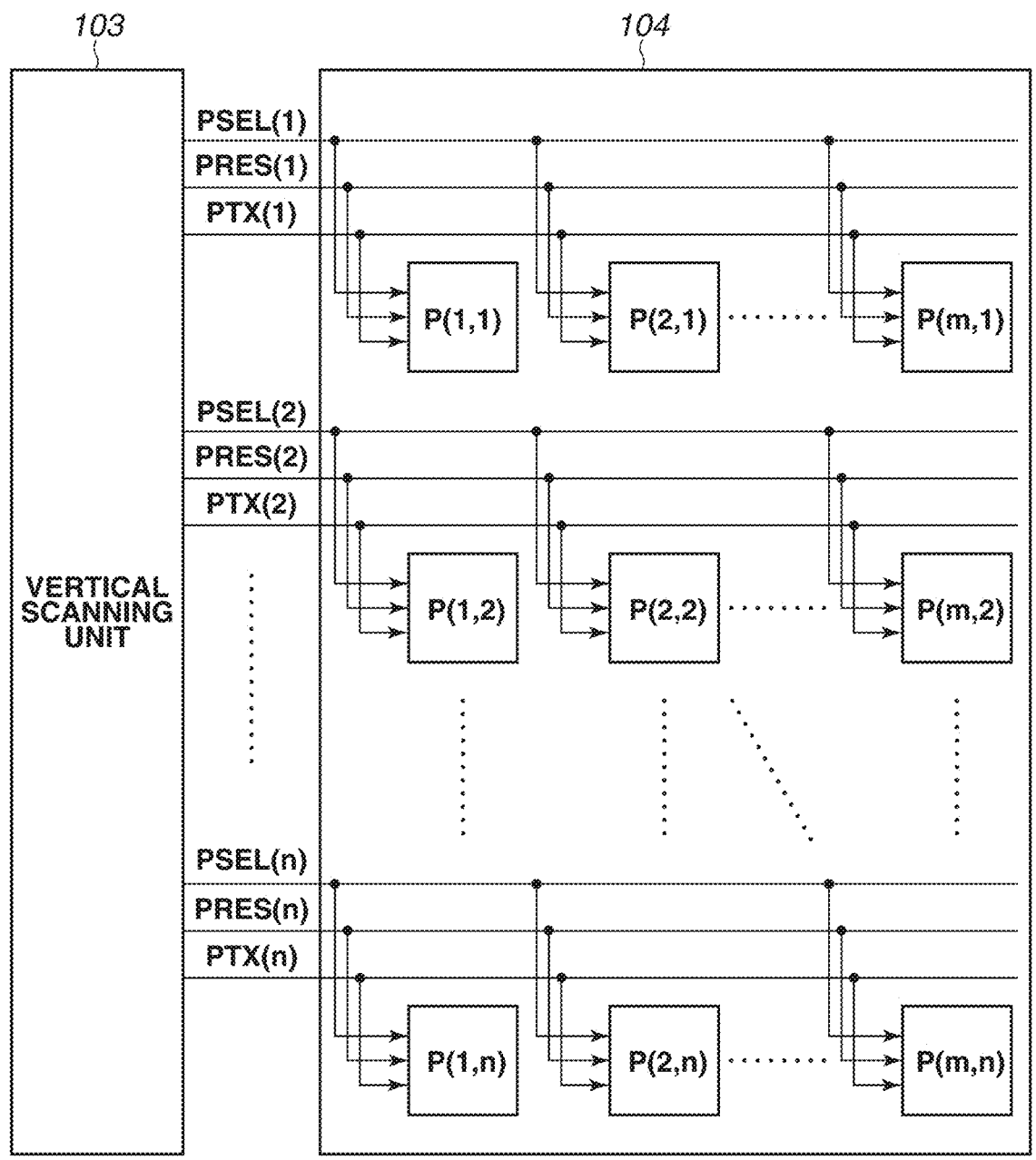
FIG. 3 is a block diagram illustrating the photoelectric conversion apparatus according to the first exemplary embodiment.

FIG. 3 is a block diagram illustrating an example of the vertical scanning unit 103 and the pixel unit 104 according to the present exemplary embodiment.

The vertical scanning unit 103 supplies control signals for outputting analog signals output from the pixels P(x, y) to a plurality of output lines Vline(x). As shown in FIG. 3, the vertical scanning unit 103 outputs the control signal PTX(y), the control signal PRES(y), and the control signal PSEL(y). In the present exemplary embodiment, y is an integer from 1 to n. The control signal PTX(y), the control signal PRES(y), and the control signal PSEL(y) output from the vertical scanning unit 103 are input to the pixels P(x, y) each arranged in the y-th row and the x-th column. In the present exemplary embodiment, x is an integer from 1 to m. Thus, the vertical scanning unit 103 controls the control signal PTX(y), the control signal PRES(y), and the control signal PSEL(y) to control a shutter operation and a readout operation of the pixels P(x, y) in the y-th row.

Figure 4:
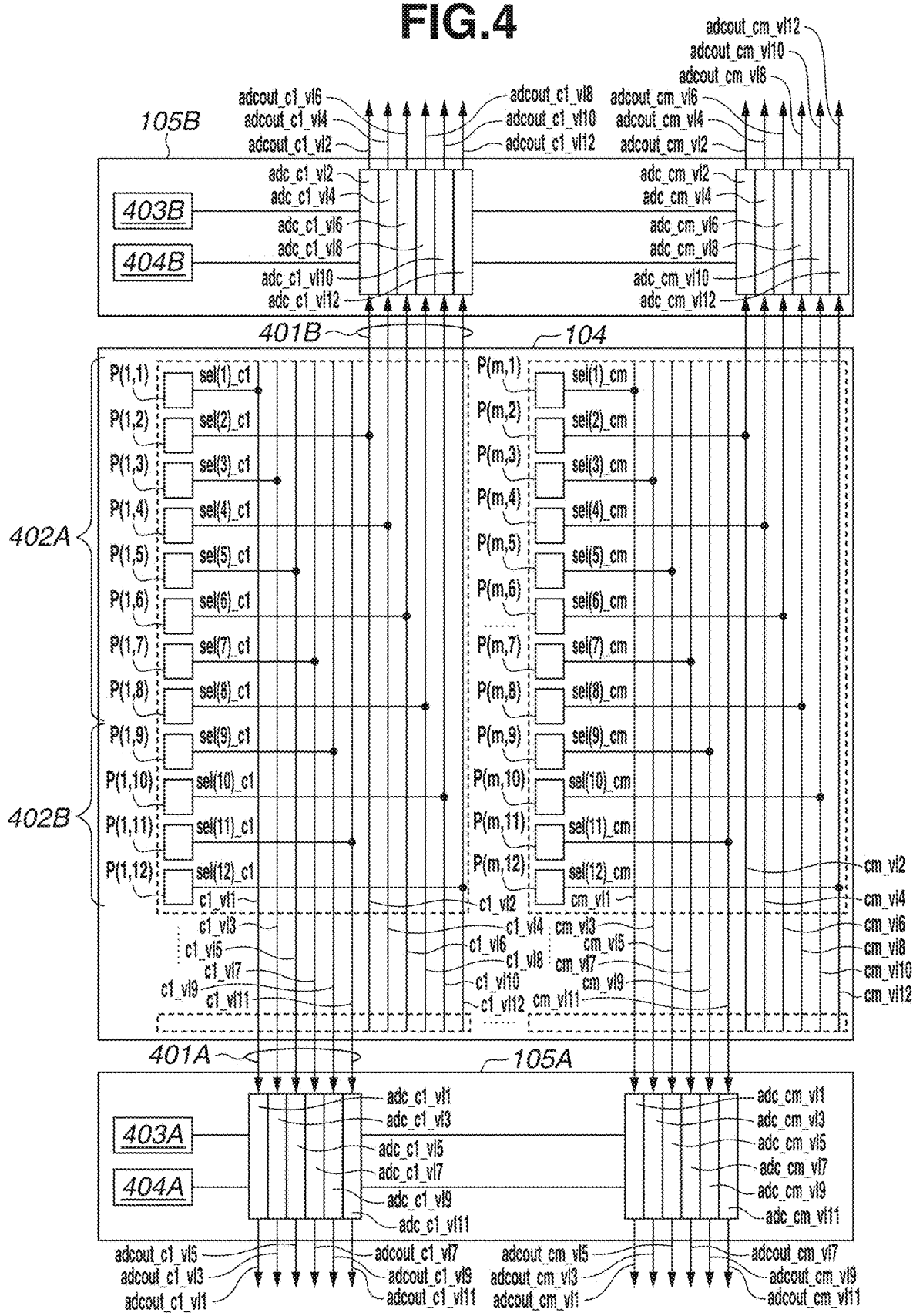
FIG. 4 is a block diagram illustrating the photoelectric conversion apparatus according to the first exemplary embodiment.

FIG. 4 is a block diagram illustrating an example of the vertical scanning unit 103, the first AD conversion unit 105A, and the second AD conversion unit 105B according to the present exemplary embodiment.

As shown in FIG. 4, the pixel unit 104 includes a plurality of pixels in each column. A first output line group 401A and a second output line group 401B are connected to the plurality of pixels in each column. The first output line group 401A and the second output line group 401B each include a plurality of output lines. The first output line group 401A and the second output line group 401B are connected to a constant current source (not illustrated).

The selection transistors 206 included in pixels P(x, r) in the r-th row and the x-th column (r is an odd number from 1 to n) are connected to the first output line group 401A via signal lines sel(r)_cx. The selection transistors 206 included in pixels P(x, s) in the s-th row and the x-th column (s is an even number from 2 to n) are connected to the second output line group 401B via signal lines sel(s)_cx.

In the present exemplary embodiment, the first output line group 401A includes six output lines for each column, and the second output line group 401B includes other six output lines for each column. The total of 12 output lines are each connected to a corresponding one of the pixels P(x, y). That is, output lines are arranged such that at least one or more of the output lines correspond to a different one of the plurality of columns, and an analog signal is output from each corresponding pixel. In the present exemplary embodiment, an output line connected to a pixel P(x, y) is referred to as an output line cx_vlt. In the present exemplary embodiment, t is an integer from 1 to 12. More specifically, as illustrated in FIG. 4, the 12 output lines connected to pixels P(1, y) in the first column are output lines c1_vlt, and the 12 output lines connected to pixels P(m, y) in the m-th column are output lines cm_vlt. The first output line group 401A is connected to the first AD conversion unit 105A. The second output line group 401B is connected to the second AD conversion unit 105B. The first AD conversion unit 105A is disposed on one end side of the output lines cx_vlt in a longitudinal direction of the output lines cx_vlt. The second AD conversion unit 105B is disposed on the other end side of the output lines cx_vlt in the longitudinal direction of the output lines cx_vlt.

The first AD conversion unit 105A includes comparators each of which generates a result of comparison between the analog signal from the pixel P(x, y) and a ramp signal. AD conversion is performed using a count signal based on the comparison result. Similarly, the second AD conversion unit 105B performs AD conversion. A ramp signal generation unit that generates the ramp signal and a count signal generation unit that generates the count signal are individually disposed in the first AD conversion unit 105A and the second AD conversion unit 105B. That is, the first AD conversion unit 105A includes a first ramp signal generation unit 403A and a first count signal generation unit 404A. The second AD conversion unit 105B includes a second ramp signal generation unit 403B and a second count signal generation unit 404B. A plurality of power supply pads for supplying power to the first AD conversion unit 105A and the second AD conversion unit 105B are disposed to be electrically separated from each other.

In the first AD conversion unit 105A, the output lines cx_vlu are connected to comparators adc_cx_vlu (u=1, 3, 5, 7, 9, and 11). In the second AD conversion unit 105B, the output lines cx_vlw are connected to comparators adc_cx_vlw (w=2, 4, 6, 8, 10, and 12). Signals which have been AD converted by the comparators adc_cx_vlt are output as output signals adcout_cx_vlt from the first AD conversion unit 105A or the second AD conversion unit 105B.

A plurality of pixels connected to eight output lines (cx_vl1, cx_vl2, cx_vl3, cx_vl4, cx_vl5, cx_vl6, cx_vl7, and cx_vl8) of the 12 output lines arranged in each column is referred to as a first pixel group 402A. A plurality of pixels connected to four output lines (cx_vl9, cx_vl0, cx_vl1, and cx_vl2) of the 12 output lines arranged in each column is referred to as a second pixel group 402B. The first pixel group 402A includes two or more pixels which are pixels of the plurality of pixels and are arranged in two or more rows. The second pixel group 402B includes two or more pixels which are the other pixels of the plurality of pixels and are arranged in two or more rows. In the present exemplary embodiment, the number of rows in which the two or more pixels included in the first pixel group 402A are arranged is larger than the number of rows in which the two or more pixels included in the second pixel group 402B are arranged. The plurality of pixels included in the first pixel group 402A and the plurality of pixels included the second pixel group 402B may be pixels not continuously arranged in the column direction.

Figure 5:
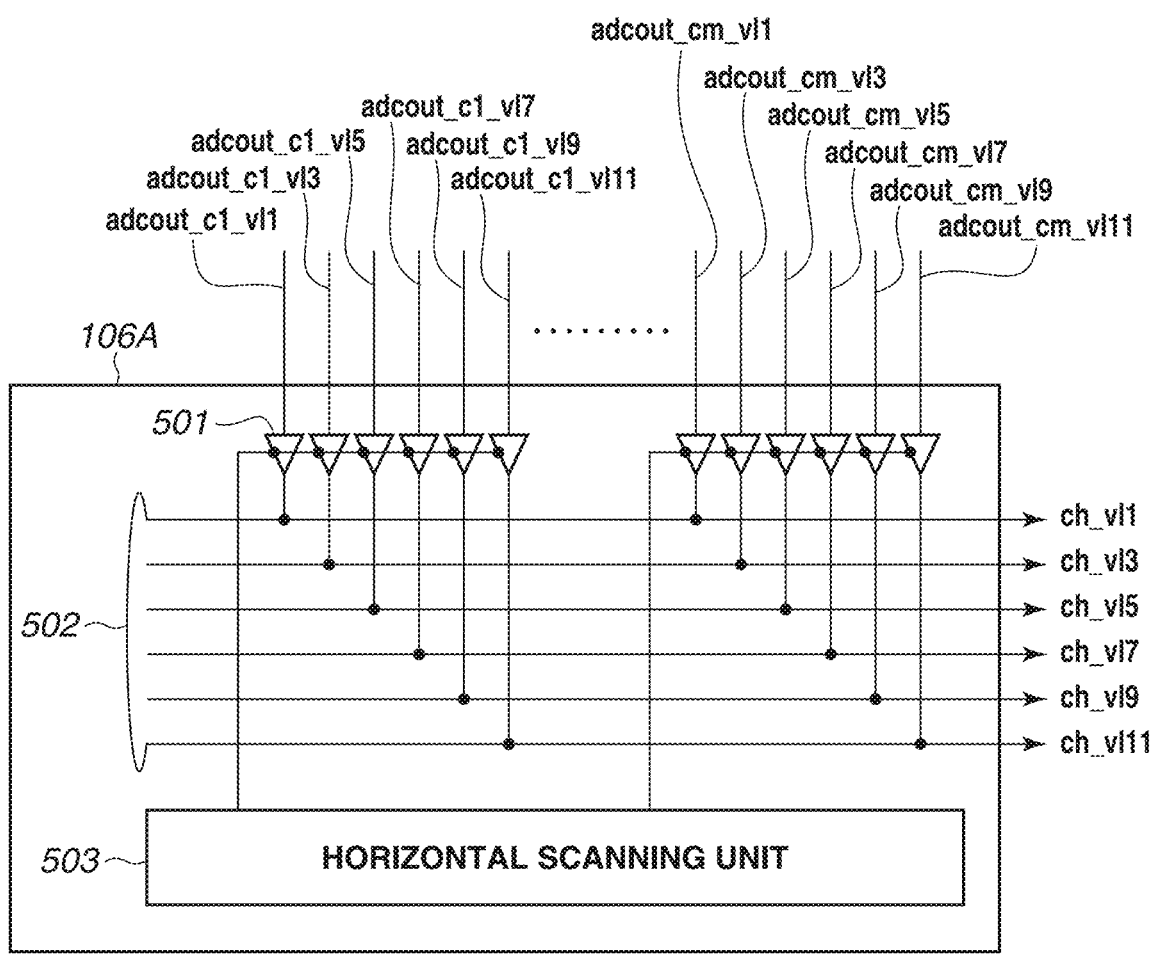
FIG. 5 is a block diagram illustrating the photoelectric conversion apparatus according to the first exemplary embodiment.

FIG. 5 is a block diagram illustrating an example of the first horizontal transfer unit 106A according to the present exemplary embodiment.

As shown in FIG. 5, the first horizontal transfer unit 106A includes, for example, a plurality of three state buffers 501, a plurality of horizontal transfer lines 502, and a horizontal scanning unit 503. The output signals adcout_cx_vlt from the first AD conversion unit 105A are each input to an input terminal of a corresponding one of the plurality of three state buffers 501. Output terminals of the plurality of three state buffers 501 are each connected to a corresponding one of the plurality of horizontal transfer lines 502. Outputs of the plurality of three state buffers 501 are controlled by the horizontal scanning unit 503. The plurality of three state buffers 501 each have a control terminal, and each state of the plurality of three state buffers 501 is switched, by a control signal input to the control terminal, between a state of outputting an output signal at the same logic level as a high- or low-level input signal and a state of maintaining the output terminal at high impedance.

The plurality of horizontal transfer lines 502 is different from each other as horizontal transfer lines ch_vl1, ch_vl3, ch_vl5, ch_vl7, ch_vl9, and ch_vl11. The output signals adcout_cx_vlu (u=1, 3, 5, 7, 9, and 11) are transmitted to the horizontal transfer lines ch_vlu via the respective ones of the plurality of three state buffers 501.

Figure 6:
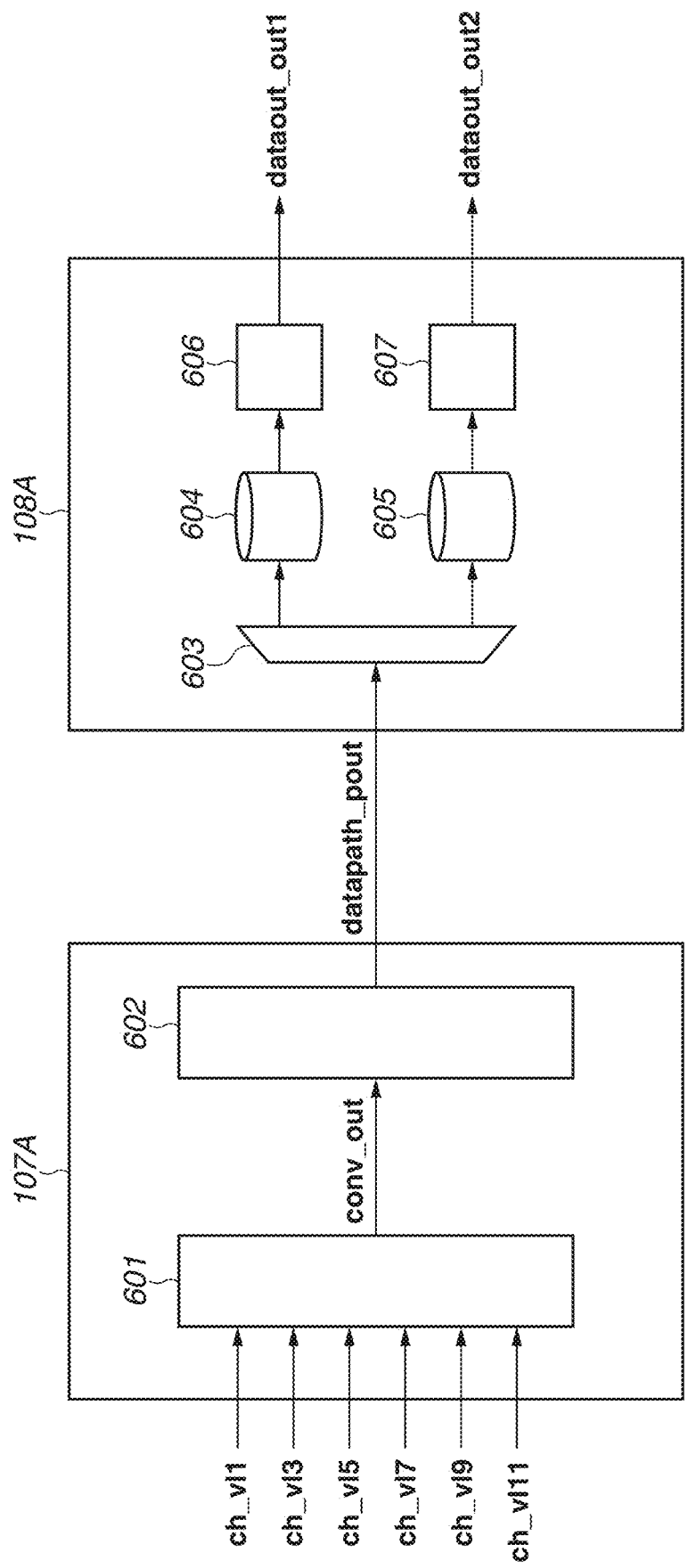
FIG. 6 is a block diagram illustrating the photoelectric conversion apparatus according to the first exemplary embodiment.

FIG. 6 is a block diagram illustrating an example of the first data processing unit 107A and the first data output unit 108A according to the present exemplary embodiment.

As shown in FIG. 6, the first data processing unit 107A includes a scan conversion unit 601 that holds pieces of input data of six rows of the horizontal transfer lines ch_vl1, ch_vl3, ch_vl5, ch_vl7, ch_vl9, and ch_vl11, and sequentially outputs a signal on a row-by-row basis. The first data processing unit 107A includes a signal processing unit 602 that performs a signal process on a scanned and converted signal conv_out output from the scan conversion unit 601.

The first data output unit 108A includes a data output switching unit 603, a first adjustment memory 604, and a second adjustment memory 605. Further, the first data output unit 108A includes a first data output processing unit 606 and a second data output processing unit 607. The data output switching unit 603 inputs a processing signal datapath_out output from the first data processing unit 107A to either the first adjustment memory 604 or the second adjustment memory 605. The first adjustment memory 604 adjusts a data output rate and then outputs data to the first data output processing unit 606. The first data output processing unit 606 converts the data output from the first adjustment memory 604 into a sensor output format. Similarly, the second adjustment memory 605 adjusts a data output rate and then outputs data to the second data output processing unit 607. The second data output processing unit 607 converts the data output from the second adjustment memory 605 into a sensor output format. A processing signal dataout_out1 from the first data output processing unit 606 and a processing signal dataout_out2 from the second data output processing unit 607 are able to be output in parallel from the first data output unit 108A.

The first data processing unit 107A processes the input signals of the six rows on a row-by-row basis in a time-division manner. The first data output unit 108A performs timing adjustment on the data input on the row-by-row basis in the time-division manner in the first adjustment memory 604 and the second adjustment memory 605 and outputs pieces of data of two rows in parallel.

Figure 7:
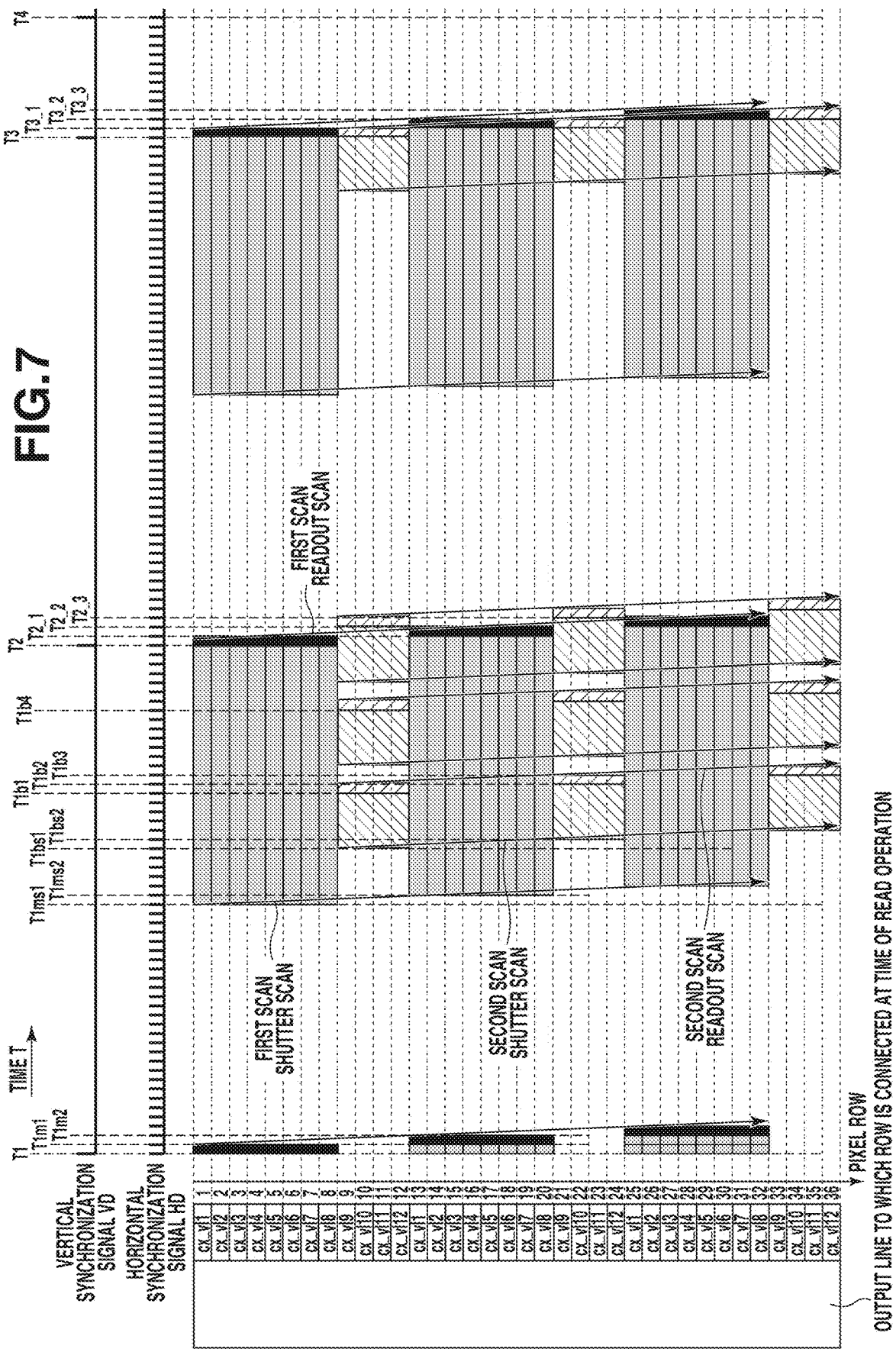
FIG. 7 is a timing chart illustrating a driving timing of the photoelectric conversion apparatus according to the first exemplary embodiment.

FIG. 7 is a timing chart illustrating an example of driving of the photoelectric conversion apparatus 1 according to the present exemplary embodiment. In the present exemplary embodiment, in a first scanning, acquisition of pixel signals is performed from a plurality of pixels (first pixel group 402A) arranged from the (12M+1)-th row to the (12M+8)-th row (M is an integer of 0 or more). In a second scanning, acquisition of pixel signals is performed from a plurality of pixels (second pixel group 402B) arranged from (12M+9)-th row to (12M+12)-th row. The first scanning is performed, for example, to acquire pixel signals to be used to generate an image for live view, and the second scanning is performed, for example, to acquire pixel signals to be used to generate an image for flicker detection.

In FIG. 7, the horizontal axis represents time, and the vertical axis represents numbers of rows of pixels P(x, y). As illustrated in FIG. 7, each frame of continuous frames includes a scanning period of the first scanning and a scanning period of the second scanning. In each frame, the first scanning and the second scanning may be performed a plurality of times. Further, one frame corresponds to a cycle of a timing at which a vertical synchronization signal VD serving as a timing signal for causing the vertical scanning unit 103 to start the first scanning is turned on. In other words, one frame corresponds to a period in which the photoelectric conversion apparatus 1 acquires pixel signals to be used to generate one image.

In acquisition of pixel signals in a readout operation, only the selection transistors 206 of the pixels P(x, y) are used, and analog signals are read out from the 12 output lines arranged in each column. In the readout operation in the first scanning, a readout is performed using eight output lines (cx_vl1, cx_vl2, cx_vl3, cx_vl4, cx_vl5, cx_vl6, cx_vl7, and cx_vl8) of the 12 output lines arranged in each column. That is, in the first scanning, control signals are supplied to the first pixel group 402A in order of the rows. On the other hand, in the readout operation in the second scanning, a readout is performed using four output lines (cx_vl9, cx_vl10, cx_vl11, cx_vl12) of the 12 output lines arranged in each column. That is, in the second scanning, control signals are supplied to the second pixel group 402B in order of the rows. At least a part of a range from the start row to the end row of the second scanning is included in a range from the start row to the end row of the first scanning. The target of the first scanning is not limited to the first pixel group 402A. For example, in one or more frames of a plurality of consecutive frames, the first scanning is performed on the first pixel group 402A, and the second scanning is performed on the second pixel group 402B. In the corresponding manner, in the other one or more frames of the plurality of consecutive frames, the first scanning may be performed on the second pixel group 402B, and the second scanning may be performed on the first pixel group 402A.

A first analog signal group including signals output from the first pixel group 402A in the first scanning is input to the first AD conversion unit 105A and the second AD conversion unit 105B. A second analog signal group including signals output from the second pixel group 402B in the second scanning is input to the first AD conversion unit 105A and the second AD conversion unit 105B.

The first analog signal group includes a first analog signal output from one or more pixels in the first pixel group 402A and a second analog signal output from the other one or more pixels in the first pixel group 402A. The second analog signal group includes a third analog signal output from one or more pixels in the second pixel group 402B and a fourth analog signal output from the other one or more pixels in the second pixel group 402B. Further, the first analog signal and the third analog signal are input to the first AD conversion unit 105A, and the second analog signal and the fourth analog signal are input to the second AD conversion unit 105B. The number of rows in which the one or more pixels in the first pixel group 402A that output the first analog signal are arranged is equal to the number of rows in which the other one or more pixels in the first pixel group 402A that output the second analog signal are arranged. In addition, the number of rows in which the one or more pixels in the second pixel group 402B that output the third analog signal are arranged is equal to the number of rows in which the other one or more pixels in the second pixel group 402B that output the fourth analog signal are arranged.

More specifically, the first analog signal output from the pixel P(1, 1) is input to the first AD conversion unit 105A via the output line cl_vl1 (first output line). The second analog signal output from the pixel P(1, 2) is input to the second AD conversion unit 105B via the output line cl_vl2 (second output line). The third analog signal output from the pixel P(1, 9) is input to the first AD conversion unit 105A via the output line cl_vl9 (third output line). The fourth analog signal output from the pixel P(1, 10) is input to the second AD conversion unit 105B via the output line cl_vl10 (fourth output line). The output lines cl_vl1, cl_vl2, cl_vl9, and cl_vl10 are arranged in the same column. The first AD conversion unit 105A and the second AD conversion unit 105B include the comparators adc_cx_vl9 and adc_cx_vl11 and the comparators adc_cx_vl10 and adc_cx_vl12, respectively, to which the first analog signal group is not input in the first scanning and the second analog signal group is input in the second scanning.

The first AD conversion unit 105A converts the first analog signal and the third analog signal into a first digital signal and a third digital signal, respectively, in parallel. The first horizontal transfer unit 106A horizontally transfers the first digital signal and the third digital signal in parallel. The first data processing unit 107A processes the first digital signal and the third digital signal, which have been horizontally transferred, in a time series on a row-by-row basis. The first data output unit 108A outputs the first digital signal and the third digital signal processed by the first data processing unit 107A, in parallel. Further, the second AD conversion unit 105B converts the second analog signal and the fourth analog signal into a second digital signal and a fourth digital signal, respectively, in parallel. The second horizontal transfer unit 106B horizontally transfers the second digital signal and the fourth digital signal in parallel. The second data processing unit 107B processes the second digital signal and the fourth digital signal, which have been horizontally transferred, in a time series on a row-by-row basis. The second data output unit 108B outputs the second digital signal and the fourth digital signal processed by the second data processing unit 107B, in parallel.

In a first frame (from time T1 to time T2), the first scanning is performed once, and the second scanning is performed twice. In correspondence with the first scanning that is performed once, shutter scanning is performed once in total and readout scanning is performed once in total. Further, in correspondence with the second scanning that is performed twice, shutter scanning is performed three times in total, and readout scanning is performed twice in total. In the first frame, the readout scanning of the second scanning is performed after the readout scanning of the first scanning.

At time T1, the readout scanning of the first scanning is started. From time T1 to time T1$m$1, pixel signals of pixels P(x, i) (i is an integer from 1 to 8) of eight rows from the first row to the eighth row are read out.

In the readout scanning, the vertical scanning unit 103 controls a control signal PTX(i), a control signal PRES(i), and a control signal PSEL(i) to perform a readout operation from the selection transistors 206 of the pixels P(x, i).

Analog signals output from the respective pixels P(x, i) are read out from the output lines cx_vli via the signal lines sel(i)_cx.

Next, from time T1$m$1 to time T1$m$2, pixel signals of pixels P(x, j) (j is an integer from 13 to 20) of eight rows from the thirteenth row to the twentieth row are read out. In the readout, the vertical scanning unit 103 controls a control signal PTX(j), a control signal PRES(j), and a control signal PSEL(j) to perform a readout operation from the selection transistors 206 of the pixels P(x, j). The analog signals output from the respective pixels P(x, j) are read out from the output lines cx_vlj via the signal lines sel(j)_cx. After the readout operation, in synchronization with a horizontal synchronization signal HD, readout scanning is sequentially performed on a total of eight rows at intervals of 12 rows.

Further, in the first frame, a shutter operation (reset release of the photoelectric conversion unit 201) corresponding to the readout scanning of the first scanning in a second frame is performed. At time T1$ms$1, a shutter operation of the first scanning is started. From time T1$ms$1 to time T1$ms$2, photoelectric conversion units 201 of the pixels P(x, i) of eight rows from the first row to the eighth row are released from the reset state. After the releasing, in synchronization with a horizontal synchronization signal HD, shutter scanning is sequentially performed on a total of eight rows at intervals of 12 rows.

Next, in parallel with the first scanning, the first shutter operation of the second scanning is performed. At time T1$bs$1, the shutter operation of the second scanning is started. From time T1$bs$1 to time T1$bs$2, the photoelectric conversion units 201 of the pixels P(x, k) (k is an integer from 9 to 12) of four rows from the ninth row to the twelfth row are released from the reset state. After the releasing, in synchronization with a horizontal synchronization signal HD, shutter scanning is sequentially performed on a total of four rows at intervals of 12 rows.

Next, the first readout scanning of the second scanning is performed. At time T1$b$1, the readout scanning of the second scanning is started. From time T1$b$1 to time T1$b$2, pixel signals of the pixels P(x, k) of four rows from the ninth row to the twelfth row are read out. In the readout scanning, the vertical scanning unit 103 controls a control signal PTX(k), a control signal PRES(k), and a control signal PSEL(k) to perform a readout operation from the selection transistors 206 of the pixels P(x, k). The analog signals output from the respective pixels P(x, k) are read out from the output lines cx_vlk via the signal lines sel(k)_cx.

Next, from time T1$b$2 to time T1$b$3, pixel signals of pixels P(x, 1) (1 is an integer from 21 to 24) of four rows from the twenty-first row to the twenty-fourth row are read out. In the readout, the vertical scanning unit 103 controls a control signal PTX(1), a control signal PRES(1), and a control signal PSEL(1) to perform a readout operation from the selection transistors 206 of the pixels P(x, 1). The analog signals output from the respective pixels P(x, 1) are read out from the output lines cx_vl1 via the signal lines sel(1)_cx.

After the readout operation, in synchronization with a horizontal synchronization signal HD, readout scanning is sequentially performed on a total of four rows at intervals of 12 rows.

Further, at time T1$b$4, the second readout scanning of the second scanning is started. The subsequent driving is similar to the driving described above.

In the second frame (from time T2 to time T3), the first scanning is performed once, and the second scanning is performed once. In correspondence with the first scanning that is performed once, shutter scanning is performed once in total, and readout scanning is performed once in total. Further, in correspondence with the second scanning that is performed once, the shutter scanning is performed once in total, and the readout scanning is performed once in total. In the second frame, the readout scanning of the second scanning is performed in parallel with the readout scanning of the first scanning.

At time T2, the readout scanning of the first scanning is started. The subsequent driving is similar to that in the first frame. Further, at time T2_2, the readout scanning of the second scanning (the third time in total with the first frame) is started in parallel with the readout scanning of the first scanning. The subsequent driving is similar to that in the first frame.

In a third frame (from time T3 to time T4), the first scanning is performed once, and the second scanning is performed twice. In correspondence with the first scanning that is performed once, shutter scanning is performed once in total, and readout scanning is performed once in total. Further, in correspondence with the second scanning that is performed once, the shutter scanning is performed once in total, and the readout scanning is performed once in total. In the third frame, the readout scanning of the second scanning is performed at the same timing as the readout scanning of the first scanning.

At time T3, the readout scanning of the first scanning and the readout scanning of the second scanning are started. The subsequent driving is similar to that in the first frame.

In the present exemplary embodiment, a readout state in each period is as follows. From time T2 to time T2_1, the readout scanning of the first scanning is performed. From time T2_1 to time T2_2, the readout scanning of the first scanning is performed. From time T2_2 to time T2_3, the readout scanning of the first scanning and the readout scanning of the second scanning are performed. From time T3 to time T3_1, the readout scanning of the first scanning and the readout scanning of the second scanning are performed. From time T3_1 to time T3_2, the readout scanning of the first scanning and the readout scanning of the second scanning are performed. From time T3_2 to time T3_3, the readout scanning of the first scanning and the readout scanning of the second scanning are performed.

In the present exemplary embodiment, in a case where only the readout scanning of the first scanning is performed, the comparators adc_cx_vl1 to adc_cx_vl8 are used. On the other hand, in a case where the readout scanning of the first scanning and the readout scanning of the second scanning are performed, the comparators adc_cx_vl1 to adc_cx_vl12 are used. That is, in the second scanning, both the first AD conversion unit 105A and the second AD conversion unit 105B which are separately disposed at the respective ends of the output lines in the longitudinal direction are used. Thus, variations in the heat generation amount in the AD conversion units, which occur depending on whether the second scanning is performed, are able to be reduced. In addition, variations in a shading shape which occur depending on whether the second scanning is performed is prevented.

Thus, according to the present exemplary embodiment, variations in image quality due to difference between driving methods are prevented from occurring in the photoelectric conversion apparatus that generates pixel signals and is capable of acquiring a plurality of images for different purposes in parallel.

Figure 8:
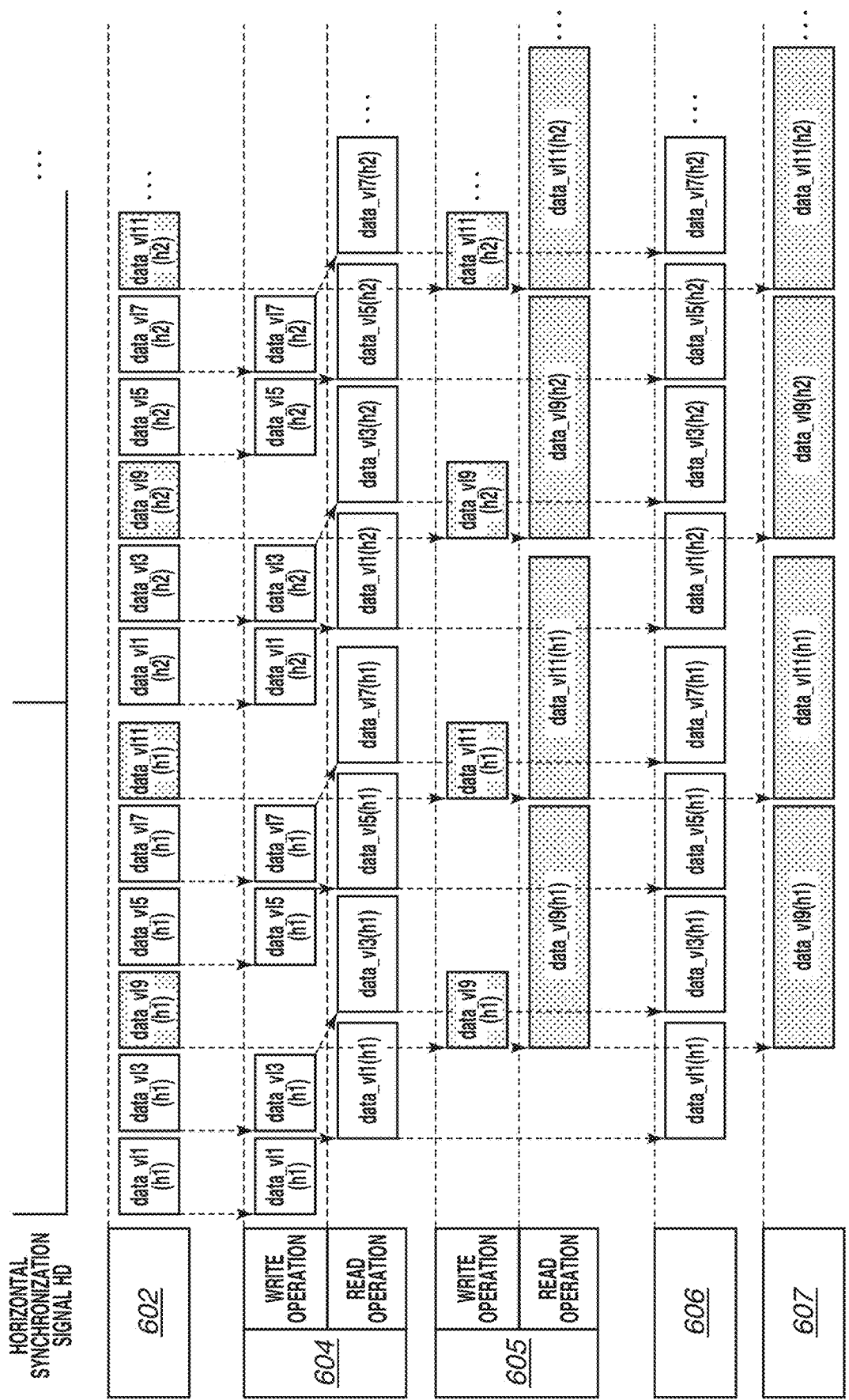
FIG. 8 is a timing chart illustrating a driving timing of the photoelectric conversion apparatus according to the first exemplary embodiment.

FIG. 8 is a timing chart illustrating an example of driving of the data processing units and the data output units included in the photoelectric conversion apparatus 1 according to the present exemplary embodiment. In the present exemplary embodiment, readout scanning of twelve rows is performed in one horizontal period, and pieces of data of six rows and pieces of data of the other six rows are read out by respective ones of the data processing units and respective ones of the data output units. FIG. 8 shows an operation sequence for two horizontal periods.

An operation in the first horizontal period will be described. As shown in FIG. 8, the signal processing unit 602 processes pieces of data of six rows which are data_vl1 (h1), data_vl3 (h1), data_vl5 (h1), data_vl7 (h1), data_vl9 (h1), and data_vl11 (h1), in time series.

Then, the first adjustment memory 604 writes therein pieces of data of four rows acquired in the first scanning, i.e., the data_vl1 (h1), the data_vl3 (h1), the data_vl5 (h1), and the data_vl7 (h1), and reads them out in accordance with a data output rate. The second adjustment memory 605 writes therein pieces of data of two rows acquired in the second scanning, i.e., the data_vl9 (h1) and the data_vl11 (h1), and reads them out in accordance with a data output rate.

Then, the first data output processing unit 606 converts the outputs of the first adjustment memory 604 into a sensor output format. The second data output processing unit 607 converts the outputs of the second adjustment memory 605 into a sensor output format. The first data output processing unit 606 and the second data output processing unit 607 operate in parallel. The similar operation is performed in a second horizontal period.

In the present exemplary embodiment, the first data output processing unit 606 and the second data output processing unit 607 are disposed as separate circuits, whereby sensor outputting of data acquired in the first scanning and data achieved in the second scanning is able to be performed in parallel. Further, in a case where the second scanning is not performed, the second data output processing unit 607 is able to be kept in a power saving state.

In the present exemplary embodiment, the vertical and horizontal directions are interchangeable. For example, the scanning direction of the vertical scanning unit 103 and the scanning direction of the horizontal scanning unit 503 may be interchanged.

A photoelectric conversion apparatus according to a second exemplary embodiment of the disclosure will be described with reference to FIG. 9. The same components as those of the first exemplary embodiment are denoted by the same reference numerals, and redundant descriptions of these components may be omitted or simplified.

The present exemplary embodiment is different from the first exemplary embodiment in that the photoelectric conversion apparatus has a laminated structure. FIG. 9 is a block diagram illustrating an example of the photoelectric conversion apparatus according to the present exemplary embodiment.

Figure 9:
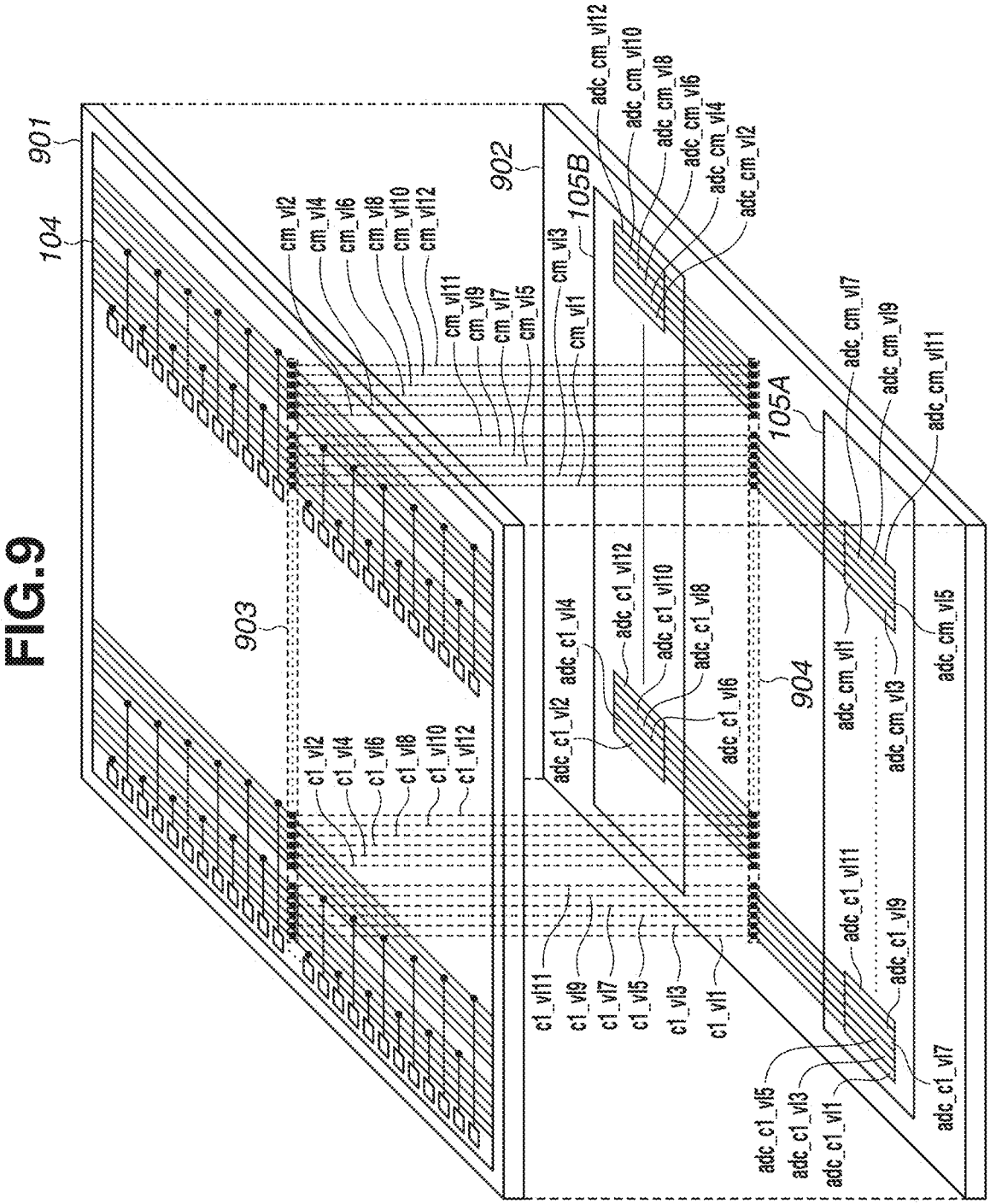
FIG. 9 is a block diagram illustrating a photoelectric conversion apparatus according to a second exemplary embodiment.

As shown in FIG. 9, a first substrate 901 and a second substrate 902 are stacked on top of another. The first substrate 901 includes the pixel unit 104 and a first metal portion 903. The second substrate 902 includes the first AD conversion unit 105A, the second AD conversion unit 105B, and a second metal portion 904. On a bonding surface of the first substrate 901, an insulating layer and the first metal portion 903 are disposed, and on a bonding surface of the second substrate 902, an insulating layer and the second metal portion 904 are disposed. Further, the insulating layer of the bonding surface of the first substrate 901 and the insulating layer of the bonding surface of the second substrate 902 are bonded to each other, and a plurality of connection portions is formed by bonding between the first metal portion 903 and the second metal portion 904. More specifically, the plurality of connection portions is formed by bonding between the first metal portion 903 of the first substrate 901 and the second metal portion 904 of the second substrate 902 to each other.

Via the plurality of connection portions (the first metal portion 903 and the second metal portion 904), at least each of the plurality of output lines cx_vlt is electrically connected to either one of the first AD conversion unit 105A and the second AD conversion unit 105B. In the plan view with respect to the main surface of the second substrate 902, the plurality of connection portions (the first metal portion 903 and the second metal portion 904) is disposed between the first AD conversion unit 105A and the second AD conversion unit 105B. The plurality of connection portions (the first metal portion 903 and the second metal portion 904) is disposed between comparators in the first AD conversion unit 105A and comparators in the second AD conversion unit 105B. The comparators in the first AD conversion unit 105A and the comparators in the second AD conversion unit 105B are arranged between an end of the first AD conversion unit 105A and an end of the second AD conversion unit 105B.

Thus, according to the present exemplary embodiment, variations in image quality due to difference between driving methods are prevented from occurring in the photoelectric conversion apparatus that generates pixel signals and is capable of acquiring a plurality of images for different purposes in parallel. Further, according to the present exemplary embodiment, with the above described configuration, even in a case where a pixel pitch is reduced, a space for arranging each transistor can be secured, which leads to achievement of miniaturization.

A photoelectric conversion apparatus according to a modification example of the second exemplary embodiment of the disclosure will be described with reference to FIG. 10. The same components as those of the first exemplary embodiment are denoted by the same reference numerals, and redundant descriptions of these components may be omitted or simplified.

The photoelectric conversion apparatus of the modification example of the present exemplary embodiment is different from the first exemplary embodiment in that the photoelectric conversion apparatus has a laminated structure. Further, the modification example of the present exemplary embodiment is different from the second exemplary embodiment in positions of a plurality of connection portions. FIG. 10 is a block diagram illustrating an example of the photoelectric conversion apparatus according to the modification example of the present exemplary embodiment.

Figure 10:
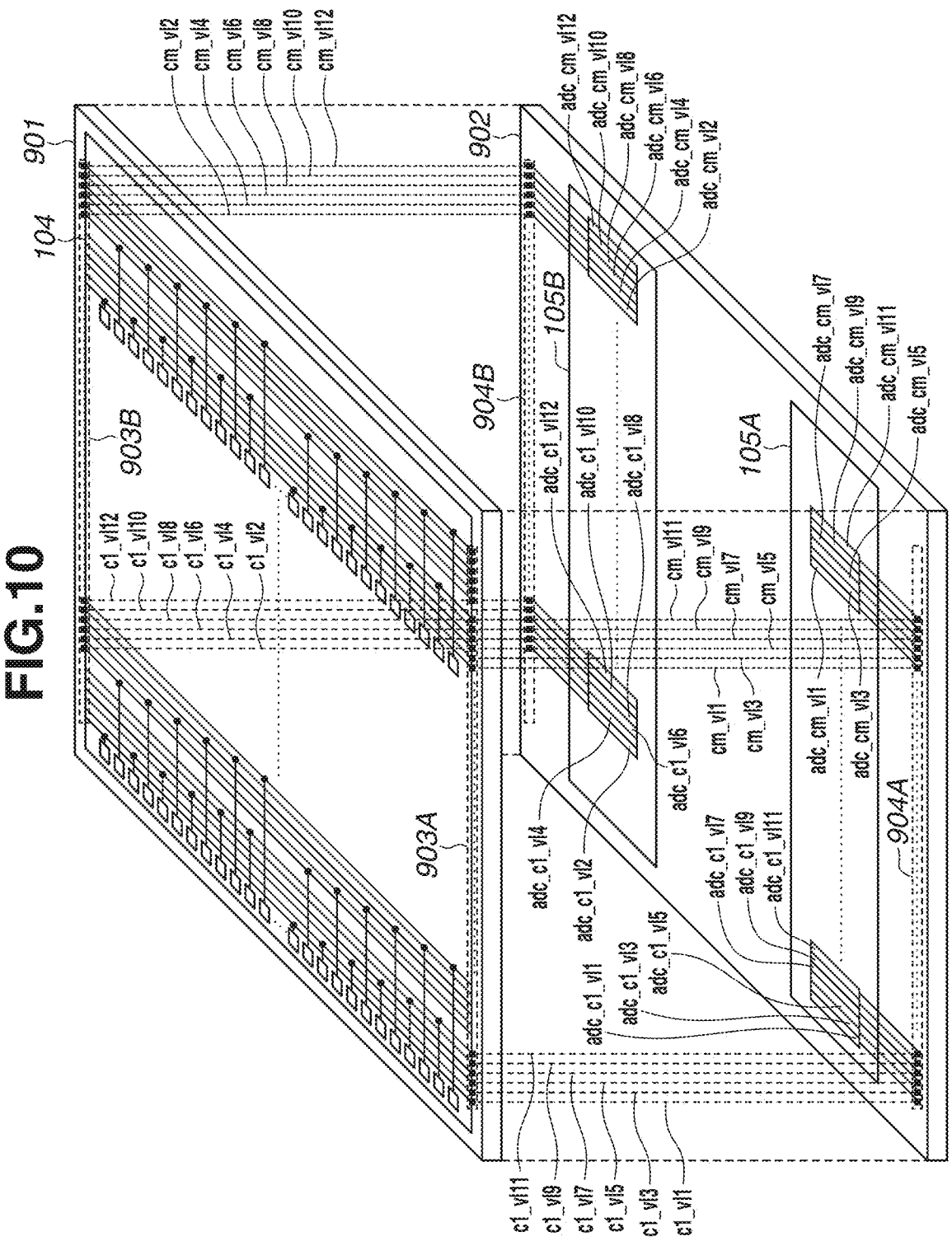
FIG. 10 is a block diagram illustrating a photoelectric conversion apparatus according to a modification example of the second exemplary embodiment.

As shown in FIG. 10, a first substrate 901 and a second substrate 902 are stacked on top of another. The first substrate 901 includes the pixel unit 104 and first metal portions 903A and 903B. The second substrate 902 includes the first AD conversion unit 105A, the second AD conversion unit 105B, and second metal portions 904A and 904B. On a bonding surface of the first substrate 901, an insulating layer and the first metal portions 903A and 903B are disposed, and on a bonding surface of the second substrate 902, an insulating layer and the second metal portions 904A and 904B are disposed. The insulating layer of the bonding surface of the first substrate 901 and the insulating layer of the bonding surface of the second substrate 902 are bonded to each other, and the plurality of connection portions is formed by bonding between the first metal portions 903A and 903B and the second metal portions 904A and 904B. More specifically, the plurality of connection portions is formed by bonding between the first metal portions 903A and 903B of the first substrate 901 and the second metal portions 904A and 904B of the second substrate 902 to each other.

Via the plurality of connection portions, at least one of the plurality of output lines cx_vlt is electrically connected to either one of the first AD conversion unit 105A and the second AD conversion unit 105B. In the plan view with respect to the main surface of the second substrate 902, some of the plurality of connection portions are arranged on one end side of the output lines cx_vlt in the longitudinal direction of the output lines cx_vlt. The other connection portions of the plurality of connection portions are arranged on the other end side of the output lines cx_vlt in the longitudinal direction of the output lines cx_vlt.

Thus, according to the modification example of the present exemplary embodiment, variations in image quality due to difference between driving methods are prevented from occurring in the photoelectric conversion apparatus that generates pixel signals and is capable of acquiring a plurality of images for different purposes in parallel. Further, according to the modification example of the present exemplary embodiment, with the above described configuration, even in a case where a pixel pitch is reduced, a space for arranging each transistor can be secured, which leads to achievement of miniaturization.

Figure 11A:
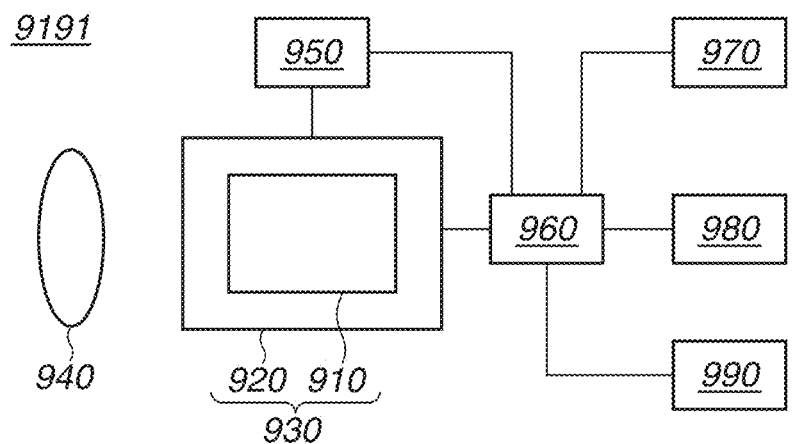
FIGS. 11A to 11C are diagrams schematically illustrating equipment according to a third exemplary embodiment.

A third exemplary embodiment is applicable to both the first exemplary embodiment and the second exemplary embodiment. FIG. 11A schematically illustrates equipment 9191 including a semiconductor apparatus 930 according to the present exemplary embodiment.

The photoelectric conversion apparatuses of the above described exemplary embodiments can be used for the semiconductor apparatus 930. The equipment 9191 including the semiconductor apparatus 930 will be described in detail. The semiconductor apparatus 930 includes a semiconductor device 910. In addition to the semiconductor device 910, the semiconductor apparatus 930 includes a package 920 that houses the semiconductor device 910. The package 920 includes a base body to which the semiconductor device 910 is fixed and a lid body made of glass or the like facing the semiconductor device 910. The package 920 further includes a bonding member, such as a bonding wire or a bump, that connects a terminal on the base body and a terminal on the semiconductor device 910.

The equipment 9191 includes at least any of an optical apparatus 940, a control apparatus 950, a processing apparatus 960, a display apparatus 970, a storage apparatus 980, and a machine apparatus 990. The optical apparatus 940 supports the semiconductor apparatus 930. The optical apparatus 940 is, for example, a lens, a shutter, or a mirror, and includes an optical system that guides light to the semiconductor apparatus 930. The control apparatus 950 controls the semiconductor apparatus 930. Examples of the control apparatus 950 include a photoelectric conversion apparatus, such as an application specific integrated circuit (ASIC).

The processing apparatus 960 processes signals output from the semiconductor apparatus 930. Examples of the processing apparatus 960 include a photoelectric conversion apparatus, such as a CPU or an ASIC, configuring an analog front end (AFE) or a digital front end (DFE). Examples of the display apparatus 970 include an electroluminescent (EL) display apparatus and a liquid crystal display apparatus that display information (image) acquired by the semiconductor apparatus 930. Examples of the storage apparatus 980 include a magnetic device and a semiconductor device that store therein the information (image) acquired by the semiconductor apparatus 930. Examples of the storage apparatus 980 include a volatile memory, such as a static random-access memory (SRAM) or a dynamic random-access memory (DRAM), and a nonvolatile memory, such as a flash memory or a hard disk drive.

The machine apparatus 990 includes a movable unit or a propulsion unit, such as a motor or an engine. In the equipment 9191, a signal output from the semiconductor apparatus 930 is displayed on the display apparatus 970 or transmitted to the outside by a communication apparatus (not illustrated) included in the equipment 9191. Thus, it is desirable that the equipment 9191 should further include the storage apparatus 980 and the processing apparatus 960 in addition to a memory circuit and an arithmetic circuit included in the semiconductor apparatus 930. The machine apparatus 990 may be controlled based on the signal output from the semiconductor apparatus 930.

The equipment 9191 is suitable for electronic equipment, such as an information terminal (for example, a smartphone or a wearable terminal) or a camera (for example, an interchangeable lens camera, a compact camera, a video camera, or a monitoring camera) having an imaging function. The machine apparatus 990 in the camera drives components of the optical apparatus 940 for zooming, focusing, and a shutter operation. Alternatively, the machine apparatus 990 in the camera moves the semiconductor apparatus 930 for an anti-shake operation.

The equipment 9191 may be transportation equipment, such as a vehicle, a ship, or a flying object (a drone, an aircraft, or the like). The machine apparatus 990 in the transportation equipment is used as a moving apparatus. The equipment 9191 as the transportation equipment is suitable for transporting the semiconductor apparatus 930 or assisting and/or automating driving (maneuvering) with an imaging function. The processing apparatus 960 for assisting and/or automating driving (maneuvering) performs processing for operating the machine apparatus 990 as a moving apparatus in accordance with information acquired by the semiconductor apparatus 930. Alternatively, the equipment 9191 may be medical equipment, such as an endoscope, measurement equipment, such as a distance measuring sensor, analysis equipment, such as an electron microscope, office equipment, such as a copier, or industrial equipment, such as a robot.

According to the above described exemplary embodiment, favorable pixel characteristics are able to be obtained. Thus, the value of the photoelectric conversion apparatus is increased. The increase in the value mentioned here corresponds to at least one of addition of a function, improvement in performance, improvement in characteristics, improvement in reliability, improvement in manufacturing yield, reduction in environmental load, reduction in cost, reduction in size, and reduction in weight.

Thus, using the semiconductor apparatus 930 according to the present exemplary embodiment in the equipment 9191 leads to improvement in the value of the equipment. For example, excellent performance is obtainable with the semiconductor apparatus 930 mounted on the transportation equipment when image capturing of the outside of the transportation equipment or measurement of the external environment is performed. Thus, in manufacturing and selling the transportation equipment, mounting the photoelectric conversion apparatus according to the present exemplary embodiment on the transportation equipment is advantageous in view of improvement in performance of the transportation equipment itself. In particular, the semiconductor apparatus 930 is suitable for transportation equipment that performs driving support and/or autonomous driving of the transportation equipment using information acquired by the photoelectric conversion apparatus.

A photoelectric conversion system and a moving object according to the present exemplary embodiment will be described with reference to FIGS. 11B and 11C.

Figure 11B:
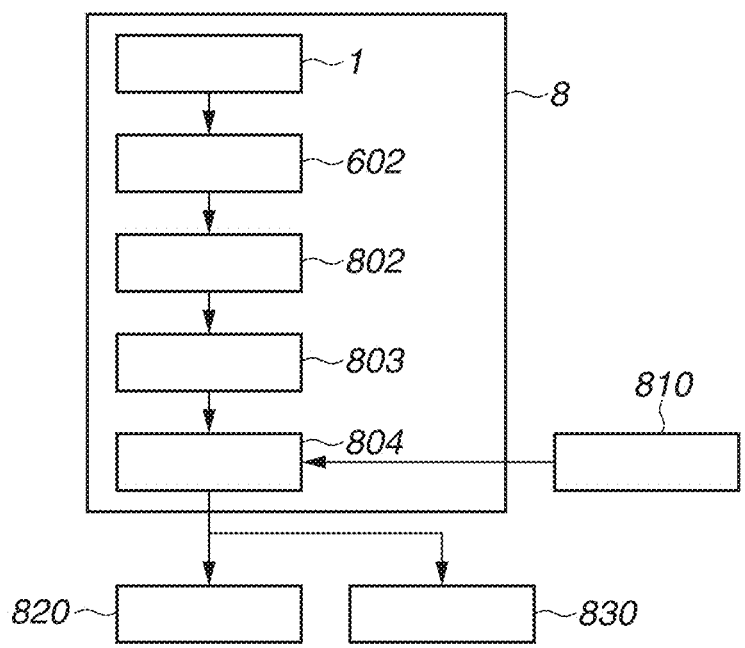

FIG. 11B is a diagram illustrating an example of a photoelectric conversion system 8 related to an in-vehicle camera. The photoelectric conversion system 8 includes the photoelectric conversion apparatus 1. The photoelectric conversion apparatus 1 is the photoelectric conversion apparatus (imaging apparatus) according to any of the above described exemplary embodiments. The photoelectric conversion system 8 includes the signal processing unit 602 that performs a signal process on a plurality of pieces of image data acquired by the photoelectric conversion apparatus 1, and a parallax acquisition unit 802 that calculates a parallax (phase difference between parallax images) from a plurality of pieces of image data acquired by the photoelectric conversion system 8. The photoelectric conversion system 8 may include an optical system, such as a lens, a shutter, or a mirror, (not illustrated) that guides light to the photoelectric conversion apparatus 1. Further, a plurality of photoelectric conversion units substantially equivalent to a pupil of the optical system may be disposed in pixels of the photoelectric conversion apparatus 1. For example, the plurality of photoelectric conversion units substantially equivalent to a pupil is arranged to correspond to one microlens. The plurality of photoelectric conversion units receives light beams transmitted through mutually different positions of the pupil of the optical system, and the photoelectric conversion apparatus 1 outputs image data corresponding to the light beams transmitted through the different positions. Then, the parallax acquisition unit 802 may calculate a parallax by using the output image data. The photoelectric conversion system 8 includes a distance acquisition unit 803 that calculates a distance to an object based on the calculated parallax, and a collision determination unit 804 that determines whether there is a possibility of collision, based on the calculated distance. The parallax acquisition unit 802 and the distance acquisition unit 803 are examples of distance information acquisition units that acquire distance information to an object. That is, the distance information is information about a parallax, a defocus amount, a distance to an object, and the like. The collision determination unit 804 may determine the possibility of collision by using any of these pieces of the distance information. The distance information may be acquired by ToF. The distance information acquisition units may be realized by hardware designed for exclusive use or may be realized by a software module. Further, the distance information acquisition units may be realized by a field programmable gate array (FPGA), an ASIC, or the like, or may be realized by a combination thereof.

The photoelectric conversion system 8 is connected to a vehicle information acquisition apparatus 810 and acquires vehicle information, such as a vehicle speed, a yaw rate, and a steering angle. Further, the photoelectric conversion system 8 is connected to an electronic control unit (ECU) 820 which is a control apparatus that outputs, based on a determination result of the collision determination unit 804, a control signal to cause the vehicle to generate a braking force. The photoelectric conversion system 8 is also connected to an alarm apparatus 830 that issues, based on the determination result of the collision determination unit 804, an alarm to a user. For example, in a case where a collision possibility is determined to be high, based on the determination result of the collision determination unit 804, the ECU 820 performs vehicle control to avoid a collision or reduce damage by applying a brake, releasing an accelerator, suppressing an engine output, or the like. The alarm apparatus 830 warns the user by issuing an alarm, such as a sound, displaying alarm information on a screen of a car navigation system or the like, vibrating a seat belt or a steering wheel, or the like.

In the present exemplary embodiment, a periphery of a vehicle, for example, the front or the rear is imaged by the photoelectric conversion system 8.

Figure 11C:
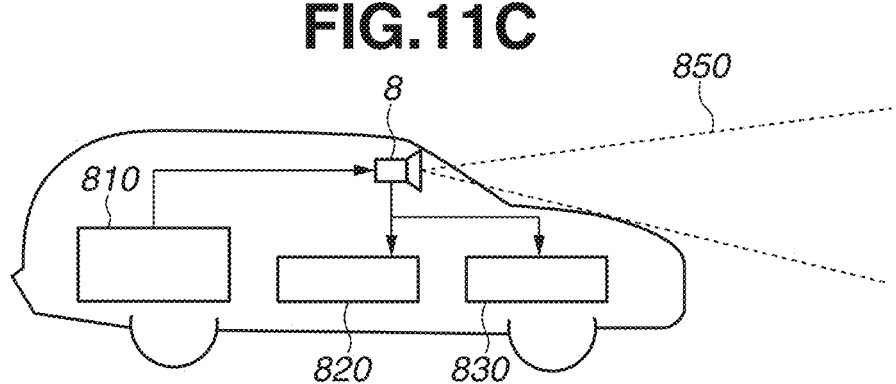

FIG. 11C is a diagram illustrating a case in which the photoelectric conversion system 8 images the front of the vehicle (imaging range 850). The vehicle information acquisition apparatus 810 transmits an instruction to the photoelectric conversion system 8 or the photoelectric conversion apparatus 1. With such a configuration, the accuracy of distance measurement is further improved.

In the above description, an example in which control is performed to avoid a collision with another vehicle has been described. Alternatively, the present exemplary embodiment is also applicable to control of autonomous driving to follow another vehicle, control of autonomous driving to avoid a deviation from a lane, and the like. Further, the application of the photoelectric conversion system 8 is not limited to a vehicle, such as an automobile, and the photoelectric conversion system 8 is applicable to a moving object (moving apparatus), such as a ship, an aircraft, or an industrial robot. The present exemplary embodiment is not limited to the moving object and is further widely applicable to various pieces of equipment using object recognition, such as an intelligent transport system (ITS).

In this specification, expressions such as "A or B", "at least one of A and B", "at least one of A or/and B", and "one or more of A or/and B" may include all possible combinations of listed items unless otherwise explicitly defined. That is, the above expression is understood to disclose all of the following cases: a case where at least one A is contained, a case where at least one B is contained, and a case where at least one A and at least one B are contained. This also applies to combinations of three or more elements.

The exemplary embodiments described above can be appropriately modified without departing from the technical idea. The disclosure of the present specification includes not only what is described in the present specification but also all matters that can be grasped from the present specification and the drawings attached to the present specification. The disclosure herein also includes the complement of the concepts described herein. That is, in the present specification, for example, when there is a description about "A is larger than B", even if a description about "A is not larger than B" is omitted, it can be said that the present specification discloses that "A is not larger than B". This is because when "A is larger than B" is described, it is assumed that the case where "A is not larger than B" is considered.

According to the present disclosure, variations in image quality due to difference between driving methods are able to be prevented from occurring in a photoelectric conversion apparatus that generates a pixel signal and is capable of acquiring a plurality of images for different purposes in parallel.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190919, filed Nov. 30, 2022, which is hereby incorporated by reference herein in its entirety.

What is claimed is:

1. A photoelectric conversion apparatus comprising:
a plurality of pixels arranged in a form of a plurality of rows and a plurality of columns;
a plurality of output lines, arranged in one to at least one correspondence between the plurality of columns and the plurality of output lines, each configured to receive an analog signal output from a corresponding pixel of the plurality of pixels;
a scanning circuit configured to supply a control signal to output the analog signal to the plurality of output lines; and
a first analog-to-digital (AD) conversion circuit and a second AD conversion circuit configured to perform AD conversion on the analog signal,
wherein the scanning circuit is configured to perform
a first scanning in which the control signal is sequentially supplied to a first pixel group in order of the plurality of rows, the first pixel group including two or more pixels that are of the plurality of pixels and arranged in two or more rows, and
a second scanning in which the control signal is sequentially supplied to a second pixel group in order of the plurality of rows, the second pixel group including other two or more pixels that are of the plurality of pixels and arranged in two or more rows,
wherein a range from a start row to an end row of the first scanning includes at least a part of a range from a start row to an end row of the second scanning,
wherein a first analog signal group output from the first pixel group in the first scanning is input to the first AD conversion circuit and the second AD conversion circuit,
wherein a second analog signal group output from the second pixel group in the second scanning is input to the first AD conversion circuit and the second AD conversion circuit,
wherein the first AD conversion circuit and the second AD conversion circuit each include a comparator to which the first analog signal group is not input in the first scanning and the second analog signal group is input in the second scanning,
wherein, in a longitudinal direction of the plurality of output lines, the first AD conversion circuit is disposed on one end side of the plurality of output lines, and
wherein, in the longitudinal direction of the plurality of output lines, the second AD conversion circuit is disposed on an other end side of the plurality of output lines.

2. The photoelectric conversion apparatus according to claim 1,
wherein the first analog signal group includes a first analog signal output from one or more pixels in the first pixel group and a second analog signal output from other one or more pixels in the first pixel group,
wherein the second analog signal group includes a third analog signal output from one or more pixels in the second pixel group and a fourth analog signal output from other one or more pixels in the second pixel group, and
wherein the first analog signal and the third analog signal are input to the first AD conversion circuit, and the second analog signal and the fourth analog signal are input to the second AD conversion circuit.

3. The photoelectric conversion apparatus according to claim 2,
wherein the plurality of output lines includes a first output line, a second output line, a third output line, and a fourth output line, and
wherein the first analog signal is input to the first AD conversion circuit via the first output line, the second analog signal is input to the second AD conversion circuit via the second output line, the third analog signal is input to the first AD conversion circuit via the third output line, and the fourth analog signal is input to the second AD conversion circuit via the fourth output line.

4. The photoelectric conversion apparatus according to claim 3, wherein the first output line, the second output line, the third output line, and the fourth output line are arranged in a same column of the plurality of columns.

5. The photoelectric conversion apparatus according to claim 2, wherein a number of rows in which the one or more pixels that output the first analog signal are arranged is equal to a number of rows in which the other one or more pixels that output the second analog signal are arranged.

6. The photoelectric conversion apparatus according to claim 5, wherein a number of rows in which the one or more pixels that output the third analog signal are arranged is equal to a number of rows in which the other one or more pixels that output the fourth analog signal are arranged.

7. The photoelectric conversion apparatus according to claim 1, wherein in one frame of a plurality of consecutive frames, each of which includes a scanning period of the first scanning and a scanning period of the second scanning, readout scanning of the second scanning is performed after readout scanning of the first scanning.

8. The photoelectric conversion apparatus according to claim 1, wherein in one frame of a plurality of consecutive frames, each of which includes a scanning period of the first scanning and a scanning period of the second scanning, readout scanning of the second scanning is performed in parallel with readout scanning of the first scanning.

9. The photoelectric conversion apparatus according to claim 7, wherein the one frame includes a plurality of scanning periods of the second scanning.

10. The photoelectric conversion apparatus according to claim 7, wherein the one frame corresponds to a cycle of a timing at which a vertical synchronization signal serving as a timing signal for causing the scanning circuit to start the first scanning is turned on.

11. The photoelectric conversion apparatus according to claim 7, wherein the one frame is a period in which the photoelectric conversion apparatus acquires a pixel signal to be used to generate one image.

12. The photoelectric conversion apparatus according to claim 1, wherein a plurality of power supply pads for supplying power to the first AD conversion circuit and the second AD conversion circuit is disposed to be electrically separated from each other.

13. The photoelectric conversion apparatus according to claim 1, wherein the first AD conversion circuit and the second AD conversion circuit perform the AD conversion by using a count signal based on a result of comparison between the analog signal and a ramp signal.

14. The photoelectric conversion apparatus according to claim 13, further comprising a first ramp signal generation circuit and a second ramp signal generation circuit configured to generate the ramp signal,
wherein the first AD conversion circuit includes the first ramp signal generation circuit, and the second AD conversion circuit includes the second ramp signal generation circuit.

15. The photoelectric conversion apparatus according to claim 13, further comprising a first count signal generation circuit and a second count signal generation circuit configured to generate the count signal,
wherein the first AD conversion circuit includes the first count signal generation circuit, and the second AD conversion circuit includes the second count signal generation circuit.

16. The photoelectric conversion apparatus according to claim 1, wherein a number of rows in which the two or more pixels in the first pixel group are arranged is larger than a number of rows in which the two or more pixels in the second pixel group are arranged.

17. The photoelectric conversion apparatus according to claim 1, wherein in one or more frames of a plurality of consecutive frames, the first scanning is performed on the first pixel group and the second scanning is performed on the second pixel group, and in other one or more frames of the plurality of consecutive frames, the first scanning is performed on the second pixel group and the second scanning is performed on the first pixel group.

18. The photoelectric conversion apparatus according to claim 1,
wherein the plurality of pixels is arranged on a first substrate, the first AD conversion circuit and the second AD conversion circuit are arranged on a second substrate, the first substrate and the second substrate are stacked on top of another, and
wherein the photoelectric conversion apparatus includes a plurality of connection portions that electrically connects at least one output line of the plurality of output lines and at least one of the first AD conversion circuit and the second AD conversion circuit.

19. The photoelectric conversion apparatus according to claim 18, wherein the plurality of connection portions is arranged between the first AD conversion circuit and the second AD conversion circuit in a plan view with respect to a main surface of the second substrate.

20. The photoelectric conversion apparatus according to claim 18, wherein one or more connection portions of the plurality of connection portions are arranged on the one end side of the plurality of output lines in the longitudinal direction of the plurality of output lines, and other one or more connection portions of the plurality of connection portions are arranged on the other end side of the plurality of output lines in the longitudinal direction of the plurality of output lines.

21. The photoelectric conversion apparatus according to claim 18, wherein an insulating layer and a metal portion are disposed on both a bonding surface of the first substrate and a bonding surface of the second substrate, the insulating layer on the bonding surface of the first substrate and the insulating layer on the bonding surface of the second substrate are bonded to each other, and the plurality of connection portions is formed by bonding between the metal portion of the first substrate and the metal portion of the second substrate.

22. The photoelectric conversion apparatus according to claim 1, wherein the first scanning is performed to acquire a pixel signal to be used to generate an image for live view, and the second scanning is performed to acquire a pixel signal to be used to generate an image for flicker detection.

23. The photoelectric conversion apparatus according to claim 2, further comprising:
a first horizontal transfer circuit and a second horizontal transfer circuit;
a first data processing circuit and a second data processing circuit; and
a first data output circuit and a second data output circuit,
wherein an output node of the first AD conversion circuit is electrically connected to an input node of the first horizontal transfer circuit, an output node of the first horizontal transfer circuit is electrically connected to an input node of the first data processing circuit, an output node of the first data processing circuit is electrically connected to an input node of the first data output circuit, an output node of the second AD conversion circuit is electrically connected to an input node of the second horizontal transfer circuit, an output node of the second horizontal transfer circuit is electrically connected to an input node of the second data processing circuit, and an output node of the second data processing circuit is electrically connected to an input node of the second data output circuit.

24. The photoelectric conversion apparatus according to claim 23,
wherein the first AD conversion circuit converts the first analog signal and the third analog signal into a first digital signal and a third digital signal, respectively, in parallel, the first horizontal transfer circuit horizontally transfers the first digital signal and the third digital signal in parallel, the first data processing circuit processes the first digital signal and the third digital signal, which have been horizontally transferred, in time series on a row-by-row basis, and the first data output circuit outputs the first digital signal and the third digital signal, which have been processed by the first data processing circuit, in parallel, and
wherein the second AD conversion circuit converts the second analog signal and the fourth analog signal into a second digital signal and a fourth digital signal, respectively, in parallel, the second horizontal transfer circuit horizontally transfers the second digital signal and the fourth digital signal in parallel, the second data processing circuit processes the second digital signal and the fourth digital signal, which have been horizontally transferred, in time series on a row-by-row basis, and the second data output circuit outputs the second digital signal and the fourth digital signal, which have been processed by the second data processing circuit, in parallel.

25. Equipment comprising the photoelectric conversion apparatus according to claim 1,
wherein the equipment further includes at least one of
an optical apparatus configured to guide light to the photoelectric conversion apparatus, a control apparatus configured to control the photoelectric conversion apparatus, a processing apparatus configured to process a signal output from the photoelectric conversion apparatus, a display apparatus configured to display information acquired by the photoelectric conversion apparatus, a storage apparatus configured to store information acquired by the photoelectric conversion apparatus, and a mechanical apparatus configured to operate based on information acquired by the photoelectric conversion apparatus.

\* \* \* \* \*